United States Patent [19]

Beall et al.

[11] Patent Number: 4,935,387
[45] Date of Patent: Jun. 19, 1990

[54] FIBER-REINFORCED COMPOSITE COMPRISING MICA MATRIX OR INTERLAYER

[75] Inventors: George H. Beall, Big Flats; Kenneth Chyung, Painted Post; Steven B. Dawes, Corning; Kisphor P. Gadkaree, Big Flats; Syed N. Hoda, Horseheads, all of N.Y.

[73] Assignee: Corning Incorporated, Corning, N.Y.

[21] Appl. No.: 261,671

[22] Filed: Oct. 24, 1988

[51] Int. Cl.$^5$ .................. C03C 10/16; C04B 35/56
[52] U.S. Cl. .................................. 501/3; 501/8; 501/9; 501/32; 501/89; 501/95; 428/698; 428/902
[58] Field of Search .............. 501/8, 9, 32, 89, 95, 501/3; 428/698, 902

[56] References Cited

U.S. PATENT DOCUMENTS

| | | | |
|---|---|---|---|
| 3,689,293 | 7/1970 | Beall | 106/39 |
| 3,732,087 | 2/1971 | Grossman | 65/33 |
| 3,756,838 | 5/1971 | Beall | 106/39.6 |
| 3,869,335 | 3/1975 | Siefert | 161/143 |
| 3,997,352 | 12/1976 | Beall et al. | 106/39.7 |
| 4,239,519 | 12/1980 | Beall et al. | 65/2 |
| 4,314,852 | 2/1982 | Brennan et al. | 501/88 |
| 4,324,843 | 4/1982 | Brennan et al. | 428/697 |
| 4,397,901 | 9/1983 | Warren | 428/101 |
| 4,399,231 | 8/1983 | Priewo et al. | 501/32 |
| 4,405,685 | 9/1983 | Honjo et al. | 428/368 |
| 4,464,475 | 8/1984 | Beall et al. | 501/9 |
| 4,485,179 | 11/1984 | Brennan et al. | 501/32 |
| 4,581,053 | 4/1986 | Priewo et al. | 65/4.21 |
| 4,588,699 | 5/1986 | Brennan et al. | 501/9 |
| 4,589,900 | 5/1986 | Brennan et al. | 65/32 |
| 4,605,588 | 9/1980 | Simpson et al. | 428/288 |
| 4,615,987 | 10/1986 | Chyung et al. | 501/8 |
| 4,642,271 | 2/1987 | Rice | 428/698 |
| 4,673,658 | 6/1987 | Gadkarre et al. | 501/89 |
| 4,711,860 | 12/1987 | Gadkaree et al. | 501/9 |
| 4,755,489 | 7/1988 | Chyung et al. | 501/8 |
| 4,828,926 | 5/1989 | Lalancette | 428/457 |
| 4,857,485 | 8/1989 | Brennan et al. | 501/7 |

OTHER PUBLICATIONS

R. L. Stewart et al., "Fracture of SiC Fiber/Glass-Ceramic Composites as a Function of Temperature", in *Fracture Mechanics of Ceramics*, R. C. Bradt et al., Ed., vol. 7, pp. 33–51, Pelnum, New York, 1986.

Primary Examiner—Mark L. Bell
Assistant Examiner—Chris Gallo
Attorney, Agent, or Firm—K. van der Sterre

[57] ABSTRACT

Ceramic matrix composite articles comprising a ceramic, glass-ceramic or glass matrix and a fiber reinforcement phase disposed within the matrix consisting of amorphous or cyrstalline inorganic fibers, wherein there is provided, on or in close proximity to the surfaces of the inorganic fibers, a layer of sheet silicate crystals constituting a sheet silicate interface between the inorganic fibers and the ceramic, glass, or glass-ceramic matrix. Optionally, the composition of the matrix may be the same as the sheet silicate interface so that the matrix provides the sheet silicate layer.

11 Claims, 1 Drawing Sheet

FIBER-REINFORCED COMPOSITE COMPRISING MICA MATRIX OR INTERLAYER

BACKGROUND OF THE INVENTION

The present invention relates to composite articles, and more particularly to mica-containing ceramic matrix composite articles reinforced with inorganic fibers and exhibiting desirable tough fracture behavior.

Fiber-reinforced ceramic matrix composites comprising glass-ceramic matrices are well known. Each of U.S. Pat. Nos. 4,615,987, 4,589,900, and 4,755,798, for example, discloses silicon carbide fiber and/or whisker reinforced glass-ceramic composites wherein the matrix consists of an alkaline earth aluminosilicate glass-ceramic composition.

Prospective uses for fiber-reinforced ceramic matrix composites such as described in these and other prior patents and literature include use as a structural element in high temperature environments such as heat engines. For these and other applications, the materials to be employed must exhibit good strength and toughness at ambient as well as at elevated temperatures.

An important problem which has been identified in silicon carbide reinforced ceramic matrix composites, particularly after exposure to temperatures in the 800°–1000° C. temperature regime in an oxidizing environment at stresses above the microcrack stress point, is that of high temperature embrittlement. Hence, instead of exhibiting high toughness and strength after exposure to temperatures in the operation ranges desired, these materials become brittle and subject to sudden catastrophic breakage, rather than more gradual failure as typical of the original material. While the exact mechanism of embrittlement has not been fully explained, oxidative deterioration of the fiber-matrix interface is the probable cause. See, for example, R. L. Stewart et al., "Fracture of SiC Fiber/Glass-Ceramic Composites as a Function of Temperature," in *Fracture Mechanics of Ceramics*, R. C. Bradt et al. Ed., Volume 7, pages 33–51, Plenum (New York) 1986.

It is known to provide coatings on fiber reinforcement to be incorporated in composite materials in order to modify the behavior of the materials or the fibers therein. For example, boron nitride coatings have been applied to silicon carbide fibers or other fibers to be incorporated in ceramic matrix materials such as $SiO_2$, $ZrO_2$, mullite, and cordierite as disclosed in U.S. Pat. No. 4,642,271. The objective of coating the fibers in that patent is to attempt to preserve the room-temperature strength and toughness of the composites at elevated temperatures.

Other coating systems and coating matrix combinations are also known. U.S. Pat. No. 4,397,901, for example, describes a composite article and method for making it wherein a woven or non-woven fiber substrate, typically composed of carbon fibers, is provided with successive coatings of pyrolytic carbon, diffused silicon, and silicon carbide to provide a composite article resistant to corrosive conditions. U.S. Pat. No. 4,405,685 describes a similar coating system for carbon fibers wherein an inner coating consisting of a mixture of carbon and a selected metal carbide, in combination with an outer coating consisting solely of the metal carbide, are described. This dual coating system is intended to provide enhanced fiber protection for fibers to be embedded in ceramic or particularly metal matrix materials.

U.S. Pat. No. 4,605,588 discloses a process for providing a boron nitride surface coating on ceramic fibers such as aluminoborosilicate fibers. The boron nitride surface coating is reportedly effective to reduce reaction bonding of the fiber to the glass or ceramic matrix, thereby preserving the necessary toughening mechanisms in the composite system. U.S. Pat. No. 3,869,335 describes metal coated fibers and metal-glass coated fibers which can be incorporated into glass matrix materials to provide products which exhibit higher ductility than conventional products.

Attempts have also been made to modify the behavior of the ceramic matrix materials used in these composites to mitigate harmful effects of the matrix on the fibers. Thus, for example, U.S. Pat. No. 4,485,179 suggests the introduction of a tantalum or niobium additive to a ceramic matrix composite containing silicon carbide fibers to reduce fiber-matrix interactions therein.

In the physical testing of ceramic matrix composites embrittled during or subsequent to high temperature exposure, decreases in fracture toughness accompanied by changes in the fracture habit of the material are typically observed. Thus the predominant fracture mode changes from one characterized by fiber pullout from the matrix to one wherein woody fracture or, ultimately, brittle fracture occurs. Woody fracture surfaces display some crack propagation parallel to the stress axis, indicating localized shear failure but without fibrous pullout. Brittle fracture surfaces display merely planar fracture surfaces as the composite exhibits no plastic deformation.

The onset of brittle fracture behavior in these composites typically occurs in conjunction with significant reductions in fracture toughness. One indicator of this reduced toughness is a drop in the extent of strain or sample elongation observed above the so-called microcrack yield point of the material, as hereinafter more fully described.

Among the factors believed to influence fracture toughness are fiber debonding and fiber pullout behavior, including the degree of frictional resistance to fiber pullout from the matrix, as well as crack deflection occurring in the matrix and at the fiber-matrix interface. It may be postulated that modifications to the matrix and/or to the fiber reinforcement which would preserve fiber debonding or pullout at elevated temperatures would significantly aid in the development of composites exhibiting good high temperature toughness. This is part of the motivation for the development of coatings designed to preserve the desirable pullout behavior of silicon carbide fibers at higher and higher temperatures.

It is therefore a principal object of the present invention to provide fiber-reinforced ceramic matrix composites exhibiting improved fiber pullout behavior and/or improved toughness retention at elevated temperatures in an oxidizing atmosphere.

It is a further object of the invention to provide a process for treating inorganic reinforcement fibers for ceramic matrix composites to improve the fiber pullout characteristics of the fibers at elevated temperatures.

Other objects and advantages of the invention will become apparent from the following description thereof.

SUMMARY OF THE INVENTION

The present invention is based on the discovery that the interposition of a fiber/matrix interface in a ceramic matrix composite, which interface consists essentially of or comprises sheet silicate crystals, can provide a combination of stability under oxidizing conditions and improved fiber pullout behavior at elevated temperatures. This desirable behavior is attributed to the presence of cleavage planes in the sheet silicate crystals which permit separation and pullout of the fibers from the matrix even after exposure of the composite to elevated temperatures.

The interface which is introduced into the composites can be provided in the form of a thin coating surrounding the individual fibers, or the entire matrix including the interface zone around the fibers may consist of a sheet silicate ceramic material. The preferred examples of sheet silicate crystals useful in the interface of the present invention are mica crystals, especially synthetic fluormica crystals produced by crystallization in situ of a silicate glass or other oxide mixture of appropriate composition.

Mica crystals are known to exhibit delamination and to cause crack deflection and branching in ceramic bodies comprising the same. We have found that this effect can be utilized to advantage in ceramic matrix composites to permit shear delamination of a mica-containing layer, even if the mica crystals are not perfectly aligned parallel to the fiber/matrix interface. Further, because of the oxidation resistance inherent in these sheet silicate materials, the interface resists destruction under high temperature oxidizing conditions.

A particular advantage of the fiber/matrix interface zone provided in accordance with the invention is that, in sheet silicate crystals of the kind employed, the cleavage energy required to delaminate the crystals can be varied from very low values, as found in some potassium phlogopite micas, to very high values as typical of certain barium-containing micas. This provides an opportunity to control the shear strength or bond strength and thus the fiber pullout behavior of the interface.

Therefore, in one aspect, the present invention comprises a ceramic matrix composite article which includes both a matrix phase consisting essentially of a ceramic material selected from the group consisting of crystalline ceramics, glass-ceramics and glasses, and a fiber reinforcement phase consisting essentially of a multiplicity of amorphous or crystalline inorganic fibers disposed within the matrix phase. As a further characteristic, the composite comprises a layer of sheet silicate crystals, disposed in close proximity to the surfaces of the inorganic fibers, which constitutes a sheet silicate interface between the inorganic fibers and the matrix phase. Optionally, the composition of the matrix of the composite may be the same as the sheet silicate interface, i.e., the matrix itself may provide the sheet silicate interface which is the essential feature of these composites.

In a second aspect, the invention provides a method for manufacturing a fiber-reinforced composite body wherein, prior to combining inorganic amorphous or crystalline reinforcing fibers with a glass, glass-ceramic, or ceramic matrix material to fabricate the composite body, the fibers are provided with at least one coating consisting essentially of crystals of a sheet silicate material or an oxide precursor for such crystals. The oxide precursor may be an oxide mixture, an oxide gel, or a glass convertible to a layer comprising the desired sheet silicate crystals by appropriate heat treatment.

The invention is not limited to use with any particular fiber reinforcement or matrix materials. Thus, although the particularly preferred fibers for use in the invention are silicon carbide fibers, any of the known inorganic reinforcement fibers may be employed. The sheet silicate interface of the invention, when incorporated with any selected fiber reinforcement into an appropriate ceramic matrix material, provides an oxidation-resistant layer which enhances the fiber pullout behavior of the fibers regardless of the composition of the particular fibers or matrix being used.

DESCRIPTION OF THE DRAWING

The invention may be further understood by reference to the drawing wherein.

DETAILED DESCRIPTION

It has been theorized in the prior art that the fracture toughness of silicon carbide-reinforced ceramic matrix composites is derived in part from a relatively weak carbonaceous interface developing between the carbide fiber and the matrix in the course of composite fabrication. This interface, considered to be graphitic in nature, permits fiber pullout in the course of mechanical failure of the composite material. This imparts tough fracture behavior and gradual failure characteristics to the composite, in direct contrast to the normally sudden and brittle failure exhibited by monolithic glass and ceramic materials.

The sheet silicate fiber/matrix interface of the present invention is designed to replace or supplement the graphite-based interface present in prior art composites, by interposing a weak oxide interface formed by sheet silicate crystals. The crystals are stable against oxidation to a higher degree than are the carbon-based interfaces of prior art composites.

Advantage of the cleavage behavior of these mica materials can be had either by coating the reinforcing fibers with a mica crystalline material, or with a glass or oxide gel thermally crystallizable thereto, or by simply utilizing as the matrix material a sheet silicate composition such as a mica glass-ceramic. While shear failure of mica glass-ceramics tends to occur at lower stresses than certain of the more refractory glass and ceramic materials utilized for the fabrication of prior art ceramic matrix composites, this disadvantage will be more than compensated for in selected applications by the enhanced toughness of the fiber-reinforced mica composites.

Particularly preferred in the practice of the invention are interface (or matrix) materials consisting of synthetic fluormica glass-ceramic materials. These materials, which are well known, typically contain uniformly distributed two-dimensional mica crystals, developed by the crystallization of fluorine-containing glass precursors, which have low cleavage energies but are very strong transverse to the direction of the crystals.

U.S. Pat. No. 3,689,293 provides a comprehensive description of one type of fluormica crystals and novel glass-ceramic materials wherein such crystals may be developed. As noted in that patent, the crystal structure of fluormica has been studied extensively, with the generalized structural formula being written as $X_{0.5-1}Y_{2-3}Z_4O_{10}F_2$. In the generalized formula, X represents cations which are relatively large in size, i.e., 1.0–1.6 Å radius, Y represents somewhat smaller cations, i.e., 0.6–0.9 Å radius, and Z represents small cations, 0.3–0.5 Å radius, which coordinate to four oxygens. The X cations are in dodecahedral coordination and the Y cations in octahedral coordination.

The basic unit of the mica structure is the $Z_2O_5$ hexagonal sheet, formed through the sharing by each $ZO_4$ tetrahedron of three of its four corner oxygens with other $ZO_4$ tetrahedra in a plane. In the fluormicas, as for all micas, two $Z_2O_5$ sheets, each with their apical oxygens and associated interstitial fluoride ions directed toward each other, are bonded by the Y cations. These cations coordinate octahedrally with two oxygens and one fluorine from each $Z_2O_5$ sheet. The resultant mica layer has been called a 2-to-1 or T-O-T layer because it consists of two tetrahedral (T) sheets with one octahedral (O) sheet. The fluoride ions and the associated apical oxygens of the tetrahedral sheet offset the anions of the octahedral sheet. The mica layers themselves are bonded to each other by the relatively large X cations in the so-called interlayer sites. These X cations are normally potassium but are sometimes such other large alkali metal and alkaline earth cations as $Na^+$, $Rb^+$, $Cs^+$, $Ca^{+2}$, $Sr^{+2}$, and $Ba^{+2}$.

As the patent indicates, glass-ceramic articles consisting essentially of fluormica crystals dispersed in a minor amount of residual glass can be produced from relatively stable opal glasses over a particularly-defined composition area. That area comprises compositions consisting essentially, by weight on the oxide basis, of about 25–60% $SiO_2$, 15–35% $R_2O_3$, wherein $R_2O_3$ consists of 3–15% $B_2O_3$ and 5–25% $Al_2O_3$, 2–20% $R_2O$ wherein $R_2O$ consists of 0–15% $Na_2O$, 0–15% $K_2O$, 0–15% $Rb_2O$, and 0–20% $Cs_2O$, 4–25% MgO, 0–7% $Li_2O$, 6–25% total of $MgO+Li_2O$, and 4–20% F.

In the micas which crystallize from glasses of this composition, the X, Y, and Z cation positions are normally filled as follows: X position—K, Na, Rb, Cs; Y position—Mg, Al, Li; and Z position—Al, B, Si. The basic mica structure identified by X-ray diffraction analysis corresponds to a fluorophlogopite solid solution. Fluorophlogopite solid solutions within the described composition range encompass at least three fluorophlogopite forms: normal fluorophlogopite, $KMg_3AlSi_3O_{10}F_2$, boron fluorophlogopite, $KMg_3BSi_3O_{10}F_2$, and a subpotassic phlogopite whose exact composition range is unknown but which is deemed to include a formula close to $K_{0.5}Mg_2Al_{.83}BSi_3O_{10}F_2$. In addition, considerable solid solution appears to exist between these phlogopite species and the lithia fluormicas, e.g., polylithionite, $KLi_2AlSi_4O_{12}F_2$.

As noted in the patent, minor additions of other oxides to the base glass composition, such as $P_2O_5$, $ZrO_2$, BaO, SrO, CaO, FeO, ZnO, CdO, $GeO_2$, $SnO_2$, and PbO, can be tolerated to a total of about 10% by weight. However, the preferred composition area for achieving desirable properties in both the glass and in the mica glass-ceramic consists essentially, in weight percent, of 35–48% $SiO_2$, 5–15% $B_2O_3$, 14–22% $Al_2O_3$, 15–25% MgO, 3–8% $K_2O$, and 5–10% F.

An alternative and desirable mica material useful as a matrix or fiber/matrix interface in accordance with the invention consists of tetrasilicic fluormica. Such materials are described, for example, in U.S. Pat. No. 3,732,087, which discloses glass-ceramic articles comprising tetrasilicic fluormica crystals as the principal crystal phase.

These glass-ceramics have the generalized structural formula $XY_{2.5}Z_4O_{10}F_2$ and can be made from relatively stable clear to opal glasses having compositions consisting essentially, in weight percent on the oxide basis as calculated from the batch, of 45–70% $SiO_2$, 8–20% MgO, 8–15% $MgF_2$, 5–25% $R_2O$, wherein $R_2O$ consists of one or more oxides selected in the indicated proportions from the group consisting of 0–20% $K_2O$, 0–23% $Rb_2O$, and 0–25% $Cs_2O$, 0–20% RO, wherein RO consists of one or more oxides selected from the group consisting of SrO, BaO and CdO, 5–35% total of $R_2O+RO$, and 0–10% of oxides selected from the group consisting of $As_2O_5$ and $Sb_2O_5$.

In the fluormicas which crystallize from these glasses, the X, Y and Z cation positions are believed to be filled as follows: X position—K, Rb, Cs, Sr, Ba or Cd as available; Y position—Mg only; and Z position—Si only. These micas, which are based on the tetrasilicic mica of the postulated formula $KMg_{2.5}Si_4O_{10}F_2$, are described as tetrasilicic because they do not display Al- or B-for-Si substitutions in the $Z_2O_5$ hexagonal sheets of the mica layer as do the fluorophlogopites ($KMg_3AlSi_3O_{10}F_2$) and boron fluorophlogopites ($KMg_3BSi_3O_{10}F_2$). Thus, although the basic mica structure of the glass-ceramics of the invention, as identified by X-ray diffraction, is of the phlogopite type, having a diffraction pattern closely matching that of boron fluorophlogopite, the tetrahedral sheets are made up exclusively of $SiO_4$ tetrahedra.

Minor additions of other oxides to the base glass composition, such as $P_2O_5$, $ZrO_2$, FeO, ZnO, $GeO_2$, MnO, $La_2O_3$, and $SnO_2$ can be tolerated to a total of about 10% by weight and may be useful, for example, in controlling the properties of the parent glass and the residual glassy phase. Particularly preferred, however, are glasses consisting essentially, in weight percent, of about 55–65% $SiO_2$, 12–20% MgO, 9–15% $MgF_2$, 5–18% $K_2O$, 0–9% BaO, and 0.5–8% $As_2O_5$.

Yet another mica material useful for providing a sheet silicate matrix or fiber/matrix interface in accordance with the invention is derived from a group of materials known as strontium fluormica glass-ceramics. These materials, disclosed in U.S. Pat. No. 3,756,838, comprise relatively refractory trisilicic mica crystals substantially free of alkali metals and $B_2O_3$ and having compositions over the range of solid solutions represented by the crystal formula $R_{0.5-1}Mg_{1.0-2.5}(AlSi_3O_{10})F_2$, wherein R is a heavy alkaline earth metal selected from the group consisting of Sr and Ba.

To achieve a high degree of development of the refractory alkali- and boron-free fluormica crystal phase, these glass-ceramics are developed from glass compositions closely approximating the range of possible mica solid solution compositions. Typically these are relatively stable, transparent to translucent glasses consisting essentially, by weight on the oxide basis, of about 30–65% $SiO_2$, 5–26% $Al_2O_3$, 10–35% MgO, 3–30% RO, wherein RO consists of 3–30% SrO, and 0–25% BaO, and 3–15% F. While complete replacement of strontium by barium in the crystal structure of these materials may readily be achieved, as a practical matter some strontium is needed to stabilize the glasses from which the glass-ceramics are developed.

The glasses may additionally include, as optional constituents, up to about 10% total of oxides selected from the group consisting of $B_2O_3$, CaO, PbO, $As_2O_3$, $Sb_2O_3$, $P_2O_5$, $SnO_2$, $ZrO_2$, ZnO, $Fe_2O_3$, MnO, BeO, and $La_2O_3$. Such additions can, in some instances, be useful for controlling the melting and forming character of the original glass or in modifying the physical properties of the parent glass and the final crystalline product. The heavy alkali metals, e.g., K, Rb, and Cs, can also be included, in partial substitution for the alkaline earth metals Sr and Ba, but these alkalis are not normally added because of their strong effects on the physical and chemical properties of these materials.

As previously indicated, sheet silicate materials such as the above described glass-ceramics can provide the desired fiber-matrix interface behavior whether employed as a fiber coating material, or as the bulk matrix material in which the reinforcing fibers are to be disposed. The use of these materials for bulk matrix materials typically involves combining the reinforcing fibers with the parent glasses, and thereafter heat-treating the glass-fiber composites to develop the desired fluormica crystal phases therein. Preferably, the process of combining the fibers with the glasses is carried out utilizing the glasses in powder form, the fibers being mixed or coated with the powdered glasses to achieve the desired ratio of fibers to matrix material.

Most conveniently, the glasses are prepared by the conventional melting of oxide and fluoride batch constituents for these glasses to form a homogeneous glass melt, and then the melt is poured into water (drigaged) to provide a glass frit of the desired composition. This frit is then milled, e.g. by ball milling, to provide a fine glass powder suitable for application to the reinforcement fibers. These powders are usually dispersed in a liquid vehicle comprising a solvent such as water and an organic binder for easy application to the fibers, the fibers being coated with the resulting powder suspension by simple dipping or spraying.

Where the sheet silicate material is to be utilized simply as the coating on the reinforcement fibers, rather than as a bulk matrix material, a similar procedure can be followed. Thus the fibers may again be coated with a suspension of thermally crystallizable glass powder. However, for this use, the thickness of the coating will be limited to that needed to provide a sheet silicate layer of the desired thickness on the fiber after consolidation with the selected bulk matrix material. Following drying of this coating, the coated fibers may be combined with the selected matrix material using conventional ceramic processing techniques.

Alternative techniques for providing sheet silicate coatings on fibers to provide a matrix/fiber interface in accordance with the invention may also be used. For example, the mica crystals making up the desired coatings may be deposited directly on the fibers from inorganic mica gels such as known in the art for the manufacture of mica papers or boards. Alternatively, the fibers may be coated with an organometallic gel which is convertible to the desired mica crystalline layer by an appropriate posttreatment of the gel coating.

Inorganic mica gels suitable for providing mica coatings on inorganic fibers are known, some gels of this type being described, for example, in U.S. Pat. No. 4,239,519. These gels, which are typically aqueous gels, comprise at least one water-swelling mica selected from the group consisting of fluorhectorite, hydroxyl hectorite, boron fluorophlogopite, hydroxyl boron phlogopite, and solid solutions among these and between these and other structurally-compatible species selected from the group of talc, fluortalc, polylithionite, fluorpolylithionite, phlogopite and fluorophlogopite. That patent contains a complete description of these gels, and is therefore expressly incorporated herein by reference for a more detailed description of the gels and the methods by which they may be made and used.

Water-swelling mica crystals may also be developed in certain of the strontium fluormica glass-ceramics of U.S. Pat. No. 3,756,838, referenced above. That patent reports specific examples of inorganic mica gels and suspensions which may also be employed to provide sheet silicate coatings on inorganic reinforcing fibers in accordance with the invention.

The use of organometallic gels to provide mica-coated fibers in accordance with the invention involves the preparation of organic solutions of the cations needed to make up the mica crystals. Conveniently, these are solutions of the alkoxides of silicon, aluminum, boron, magnesium and selected alkali and/or alkaline earth metals which will form alkoxide gels upon exposure to gelling agents such as water. The mica crystals are then developed directly in the gels by an appropriate heat treatment. Most preferably, the crystals are developed in situ on the fibers by first coating the fibers with the sols, inducing gelation of the sols, and then heat-treating the fibers comprising the resulting gelled coatings.

The organic gel method has the advantage of permitting the use of highly pure precursors to give high purity coatings, and also facilitates the synthesis of mica crystals having compositions which cannot readily be developed in thermally crystallizable glasses. In addition, the mica coating may be developed at relatively low temperatures, as there is no need for melting, and the coating generally consists of mica crystals of extremely fine particle size.

As previously indicated, while the use of reinforcing fibers of silicon carbide or silicon oxycarbide composition (hereinafter simply referred to as silicon carbide fibers) is preferred for the present composites, other fibers useful for the reinforcement of ceramic matrix materials may also be used. Examples of other inorganic fibers which can be employed in substitution or addition to silicon carbide fibers in the selected matrix include carbon, alumina, $B_4C$, BN, zircon, mullite, spinel or silicon nitride fibers. In general, the fiber coating procedures useful for the application of sheet silicate materials to silicon carbide fibers will also be useful for the processing of these alternative fiber materials.

Of course it will be recognized that additional coatings may be present on the reinforcing fibers to be incorporated into ceramic matrix composites without departing from the spirit and scope of the invention. Thus, for example, underlying fiber coatings may be provided to act as a barrier against the migration of chemical species into or away from the fibers, as may overcoatings designed to control ion migration into or away from the sheet silicate coating. In either case, the mica or other sheet silicate layer provides a fiber/matrix interface wherein the advantageous physical and chemical properties of the sheet silicate structure are retained.

Where ceramic matrix materials other than mica glass-ceramics are to be used to form the composite, the matrix material may be selected from among essentially any of the ceramic materials known to the art. Preferably, however, materials selected from the group consisting of aluminosilicate glasses, alkaline earth aluminosilicate glass-ceramics, and lithium aluminosilicate glass-ceramics will be used.

Useful aluminosilicate glasses include alkali-free alkaline earth aluminosilicate glasses which are substantially free of alkali metal oxides such as Na2O, Li2O, and K2O, but which comprise one or more alkaline earth metal oxides selected from the group consisting of CaO, MgO, SrO and BaO. They will preferably consist essentially, in weight percent on the oxide basis, of about 50–66% SiO2, 11–19% Al2O3, 20–30% total of RO, wherein RO consists of one or more oxides selected from the group consisting of CaO, MgO, SrO and BaO, 0–8% B2O3, and 0–2% of As2O3. A specific example of such a glass is Code 1723 glass, commercially available from Corning Glass Works, Corning, N.Y., and containing about 58% SiO2, 15% Al2O3, 4% B2O3, 7% MgO, 10% CaO and 6% BaO.

Useful glass-ceramic matrix materials include glass-ceramics wherein the predominant crystal phase is selected from the group of anorthite (CaO.Al2O3.2SiO2) and its pseudo-binaries with mullite (3Al2O3.SiO2), cordierite (2MgO.2Al2O3.5SiO2), barium osumilite (BaO.2MgO.3Al2O3. 9SiO2) albite solid solution (Na2O.Al2O3.6SiO2), Al2O3, SiO2, CaO.SiO2, and gehlenite (2CaO.Al2O3.SiO2). These are known from U.S. Pat. No. 4,615,987, and may be produced through the crystallization of glasses consisting essentially, in weight percent, of about 0–25% CaO, 0–30% SrO, 10–30% CaO+SrO, 0–15% MgO, 0–25% BaO, 0–4% Na2O, 0–6% K2O, 25–38% Al2O3, 0–12% TiO2, 35–60% SiO2, 0–15% ZrO2, 0–3% As2O3, and 0–30% total of BaO+MgO+Na2O+K2O+TiO2+ZrO2+As2O3.

An alternative type of glass-ceramic matrix is one comprising a predominant crystal phase consisting essentially of triclinic anorthite in solid solution with at least one of mullite and alpha alumina. These glass-ceramics are known from U.S. Pat. No. 4,755,489 and may be produced by the thermal crystallization of glasses consisting essentially, in weight percent, of about 16–20% CaO, 38.5–46% Al2O3, 35–42% SiO2, 0.25–1.5% As2O3, and up to 10% total of at least one nucleating agent selected in the indicated proportion from the group consisting of 0.1–3% Cr2O3, 0.25–3% HfO2, 2–5% MoO3, 0.25–3% Nb2O5, 0.25–3% Ta2O5, 0.25–3% WO3, and 1–10% ZrO2, the composition being substantially free of TiO2 and containing Al2O3 in an amount which is at least 10 mole percent and up to 50 mole percent in excess of that present in stoichiometric triclinic anorthite.

As is known from U.S. Pat. No. 4,485,179, Nb2O5 and/or Ta2O5 may be useful in ceramic matrix composites not only as nucleating agents but also to protect SiC fibers from deterioration in use. Therefore, matrix glass-ceramics in accordance with the invention may in some cases contain these oxides as additional constituents, typically in amounts not exceeding 1–10% total of Ta2O5 or Nb2O5. Similarly, the inclusion of 0.5–3% As2O3 can be useful in these matrices to help to protect SiC whiskers and fibers from oxidation.

Table I below provides examples of compositions for glass-ceramic matrix materials suitable for use in accordance with the invention which are not sheet silicate materials. Examples A and B of Table I represent glass compositions which are thermally crystallizable to barium stuffed cordierite as the predominant crystal phase, while compositions C and D form barium osumilite and compositions E and F form anorthite as predominant crystal phases. Compositions G and H represent glasses which are thermally crystallizable to glass-ceramic materials wherein the predominant crystal phase is triclinic anorthite in solid solution with one or both of mullite and/or alumina. Compositions reported in Table I are given in parts by weight on the oxide basis.

TABLE I

|  | A | B | C | D | E | F | G | H |
|---|---|---|---|---|---|---|---|---|
| SiO2 | 42.4 | 43.66 | 50.63 | 53.2 | 45.6 | 48.1 | 35.4 | 39.5 |
| Al2O3 | 36.0 | 37.11 | 27.66 | 25.0 | 36.2 | 35.6 | 45.0 | 38.5 |
| CaO | — | — | — | 14.1 | 8.1 | 16.5 | 19.0 | 18.4 |
| BaO | 6.0 | 6.20 | 13.27 | 12.5 | — | — | — | — |
| MgO | 12.6 | 13.03 | 3.44 | 8.4 | 4.4 | 8.3 | — | — |
| As2O3 | 0.68 | 0.70 | 1.0 | 1.0 | 0.5 | 0.5 | 0.05 | 0.48 |
| ZrO2 | 3.0 | — | — | — | — | — | 3.0 | 3.0 |

Examples of matrix materials of the sheet silicate type, as well as additional information relating to the composites of the invention and the fabrication thereof, are shown in the following illustrative examples.

EXAMPLES 1–9

To provide matrix materials for a series of ceramic matrix composite articles, nine glass compositions thermally crystallizable to fluormica glass-ceramics by appropriate thermal treatment are selected for melting. Each of the compositions selected is thermally crystallizable to yield a principal crystal phase consisting of a trisilicic or tetrasilicic mica, or a combination of such micas.

The compositions selected for use are reported in Table II below. Included in Table II for each of the glasses reported are the composition of the glass, in parts by weight and an indication of the principal mica crystal phase(s) developed therein upon appropriate thermal treatment.

To prepare the glasses, glass batches of the indicated composition are compounded and melted in closed crucibles to produce homogeneous glass melts, and the melts are then drigaged to form a particulate glass frit of each selected composition.

TABLE II

| Matrix Compositions | | | | | |
|---|---|---|---|---|---|
|  | 1 | 2 | 3 | 4 | 5 |
| SiO2 | 39.5 | 40.0 | 58.6 | 58.6 | 44.5 |
| Al2O3 | 17.1 | 11.3 | — | — | — |
| MgO | 14.0 | 16.7 | 13.4 | 13.4 | 18.6 |
| MgF2 | 15.0 | 15.7 | 17.3 | 17.3 | 17.5 |
| B2O3 | 8.6 | — | — | — | 9.5 |
| BaO | — | 17.0 | — | — | — |
| K2O | 5.7 | — | 11.5 | 11.5 | 11.6 |
| As2O3 | — | — | — | 1.0 | — |
| Crystal Phase(s)* | 1 + 5 | 2 | 3 | 3 | 4 |

|  | 6 | 7 | 8 | 9 |
|---|---|---|---|---|
| SiO2 | 42.8 | 54.0 | 49.5 | 44.5 |
| Al2O3 | 12.1 | 2.8 | 5.7 | 8.5 |
| MgO | 17.9 | 14.2 | 15.1 | 15.9 |
| MgF2 | 16.8 | 16.9 | 16.5 | 16.1 |
| BaO | — | 4.3 | 8.5 | 12.8 |
| K2O | 11.2 | 8.6 | 5.8 | 2.9 |
| Crystal | 1 | 3 + 2 | 2 + 3 | 2 + 3 |

TABLE II-continued

Matrix Compositions

Phase(s)*

*Crystal Phases - Table II
1 - $KMg_3(AlSi_3O_{10})F_2$
2 - $Ba_{0.5}Mg_3(AlSi_3O_{10})F_2$
3 - $KMg_{2.5}(Si_4O_{10})F_2$
4 - $KMg_3(B(Si_3O_{10})F_2$
5 - Mullite $(3Al_2O_3.SiO_2)$ The particulate glass thus provided is next ground by ballmilling to produce a particle size sufficiently fine (10 microns average particle size) for the preparation of a particulate glass suspension suitable for the coating or impregnation of inorganic fibers or fiber tows. Suspensions are thereafter made from these glasses by combining the powdered glass with an aqueous vehicle/binder system.

One of two binder systems is employed, comprising either an acrylic binder (ACRYL) or a polyvinyl acetate binder (PVAC). Where an acrylic binder is used, the suspension comprises 250 parts by weight of powdered glass, 462 parts by weight of water, 155 parts by weight of isopropanol, 120 parts by weight of HA-8 acrylic binder, 9 parts by weight of TT615 thickener, and 5 parts by weight of TAM 850 dispersant, each of the binder, thickener and dispersant being commercially available from Rohm and Haas of Philadelphia, Pa.

Where a polyvinyl acetate binder is used the suspension comprises 400 parts by weight of isopropanol, 40 parts by weight of water, 180 parts by weight of powdered glass, 30 parts by weight of a polyvinyl acetate polymer binder, 4 parts by weight of diethylene glycol as a plasticizer, and 4 parts by weight of a dispersant. The polymer binder and dispersant used are commercially available, the binder consisting of Vinac ™ B15 grade polyvinyl acetate from Air Products and Chemicals, Inc., Allentown, Pa., and the dispersant consisting of Katapol ™ VP532 dispersant from the GAF Corporation, Wayne, N.J.

A fiber reinforcement material is next selected for incorporation into the composite articles. The fiber material selected is a commercially available fiber tow made up of Nicalon ® silicon carbide fibers. These tows are commercially available from the Nippon Carbon Company of Tokyo, Japan.

Composite preforms comprising the particulate glass materials and the silicon carbide fiber tows are next prepared by first drawing the fiber tows through the particulate suspensions of the glasses, the thus impregnated tows being thereafter immediately wound onto a drum to form a multilayer winding. The resulting multilayer winding or prepreg is then cut from the drum, dried as a flat sheet, and cut into flat sheets for the subsequent assembly of preforms for fiber-reinforced composite products.

Preforms for mica matrix composite articles are next prepared from the prepreg sheets by stacking the sheets, with uniaxial fiber alignment, to form a prepreg stack of 8 sheets. Each stack is then processed through a binder burnout at 650° C., and then a hot-pressing step at a peak pressure of 1500 psi and a peak temperature in the range of 1100°-1400° C. The product in each case is a dense, consolidated fiber-reinforced composite wherein the matrix, and thus the fiber/matrix interface zones within the composite, consist of the identified mica crystal phase.

Figure 1:
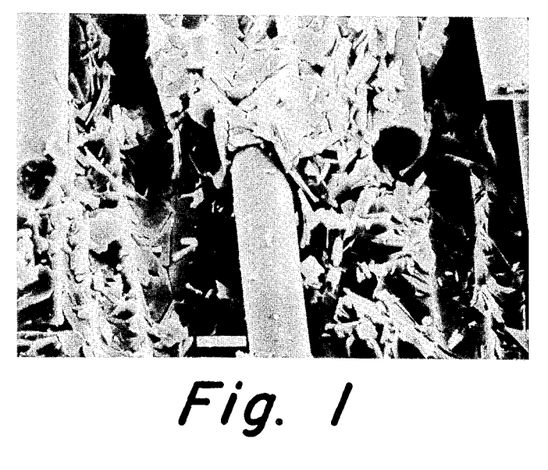
FIG. 1 is an electron photomicrograph of the fracture surface of a composite provided in accordance with the invention demonstrating the behavior of sheet silicate crystals therein.

The microstructure of a typical ceramic matrix composite product produced as described is illustrated in FIG. 1 of the drawing. FIG. 1 is a scanning electron photomicrograph of the fracture surface of a composite having the composition of Example 4 of Table I, wherein the white bar indicates a dimension of 10 microns. The presence of a well crystallized potassium tetrasilicic fluormica crystal phase in the matrix is evident from the multiplicity of small crystal platelets which have been exposed by the fracture. Also evident is the fact that the character of the fiber/matrix interface in these composites permits clean fiber pullout from the matrix in the course of fracture.

In general, physical testing of the products produced as described indicates good fracture toughness and excellent fiber pullout behavior during stress-induced flexural failure of the composites at 25° C. Further, some of the composites retain superior fiber pullout when stressed to failure at 1000° C., a characteristic which has proven very difficult to achieve with silicon carbide fiber reinforcement in other composite systems.

Composites prepared from matrix materials 2 and 4 shown in Table I above appear to exhibit the best fracture behavior of the products prepared. The results of physical properties testing for these composites are reported in Table III below. Included in Table III for each of these products are data relating to the processing of the products, including identifications of the binder system used to prepare the prepregs and the peak processing temperature at which hot pressing of the prepregs was carried out. While some differences in performance appear to result from changes in the binder system employed for prepreg fabrication, these are small and are not considered determinative of the ultimate properties achieved.

Also reported in Table III are the elastic and ultimate stress and strain data recorded for each of the samples as determined in 4-point flexure utilizing a 20 mm load span and a 60 mm support span. All strains (Stn.) are reported as sample elongation in %, while stresses (Str.) are reported in ksi.

As conventional, the values of elastic stress and strain correspond to the stress/strain point at which non-linearity is first observed in the stress-strain curve for the material being tested, this value sometimes being referred to as the microcrack yield point. The ultimate flexural stress and strain are recorded at the point of highest stress supported by the composite product prior to flexural failure.

Table III also reports information as to the fracture behavior observed for the products being tested, including an indication of the failure mode, whether in shear (S), or under tension (T), and an indication of the fracture habit observed, whether involving fiber pullout (F) or a combination of fiber pullout and brittle (B) or woody (W) fracture.

TABLE III

| | | | Product Analysis | | | | | |
|---|---|---|---|---|---|---|---|---|
| | Process Temp. | Slurry System | Test Temp. | Elastic Str. - Stn. | | Ultimate Str. - Stn. | | Flexural Fracture |
| Ex. | °C. | Binder | °C. | (ksi) | (%) | (ksi) | (%) | Data |
| 2 | 1300° | ACRYL | 25° | 12 | 0.06 | 29 | 0.16 | T,S,F |

TABLE III-continued

| Ex. | Process Temp. °C. | Slurry System Binder | Test Temp. °C. | Elastic Str. - Stn. | | Ultimate Str. - Stn. | | Flexural Fracture Data |
|---|---|---|---|---|---|---|---|---|
| | | | | (ksi) | (%) | (ksi) | (%) | |
| | | | 1000° | 22 | 0.28 | 33 | 0.5 | S,B-W,F |
| 2 | 1300° | PVAC | 25° | 29 | 0.15 | 32 | 0.17 | S,F |
| | | | 1000° | 29 | 0.32 | 37 | 0.54 | S,B-W,F |
| 4 | 1200° | ACRYL | 25° | 15 | 0.11 | 56 | 0.55 | S,F |
| | | | 1000° | 17 | 0.22 | 36 | 0.58 | S,F |
| 4 | 1200° | PVAC | 25° | 17 | 0.13 | 47 | 0.44 | S,F |
| | | | 1000° | 11 | 0.15 | 33 | 0.49 | S,F |

Data representing the physical properties of three additional compositions from Table II are included in Table IV below. Included in Table IV for each of the compositions described are an indication of the process temperature employed for consolidation, the test temperatures employed for physical testing of each of the composite products, and data representing the elastic (microcrack yield) and ultimate flexural strengths for the composites as reported above in Table II.

TABLE IV

| Ex. | Process Temp. °C. | Test Temp. °C. | Elastic Str. - Stn. | | Ultimate Str. - Stn. | | Flexural Fracture Data |
|---|---|---|---|---|---|---|---|
| | | | (ksi) | (%) | (ksi) | (%) | |
| 1 | 1100° | 25° | 27 | 0.19 | 68 | 0.51 | S,F |
| | | 900° | 2.6 | 0.05 | 5.2 | 0.19 | Def. |
| 5 | 1100° | 25° | 19 | 0.1 | 70 | 0.47 | S,F |
| | | 900° | 1.6 | 0.02 | 5.4 | 0.64 | Def. |
| 6 | 1340° | 25° | 13.8 | 0.11 | 19 | 0.16 | S,F |

As is evident from a study of the data in Table IV, each of the composite products failed in shear under flexural stress testing at 25° C., and demonstrated good fiber pullout behavior under testing at this temperature. However, because these matrix compositions are generally not as refractory as are the compositions shown in Table III, deformation at relatively low ultimate stress values, rather than fracture of the products, is observed under high temperature flexural testing at 900° C.

It is generally found that the temperature at which the composite article is consolidated can affect the physical properties of the product. Hence, the properties reported for Example 1 in Table IV are those demonstrated at the optimum consolidation temperature of 1100° C. At higher consolidation temperatures, decreases in the ultimate strength of the composite are observed. Similarly, Example 2 in Table III exhibits optimum properties following consolidation at 1300° C. as shown, with less favorable performance resulting from consolidation at 1250° C. or 1340° C. Example 4 in Table III exhibits optimum properties at the reported consolidation temperature of 1200° C.

Of course, composition variations can also affect the physical properties of the composites. Thus a comparison of the properties of a composite having the matrix composition reported as Example 3 in Table II, which is similar to Example 4 but for the omission of a minor arsenic component therefrom, indicates less favorable physical properties for the former material. Specifically, this component appears to significantly enhance the ultimate flexural strength of the Example 4 composite at both 25° C. and at 1000° C.

As hereinabove set forth, a feature of particular significance offered by some of the composite products provided in accordance with the present invention is the retention of a fiber pullout fracture characteristic under flexural failure at high temperatures, e.g., at 1000° C. An illustration of this desirable fracture behavior is provided in the micrograph constituting FIG. 2 of the drawing.

Figure 2:
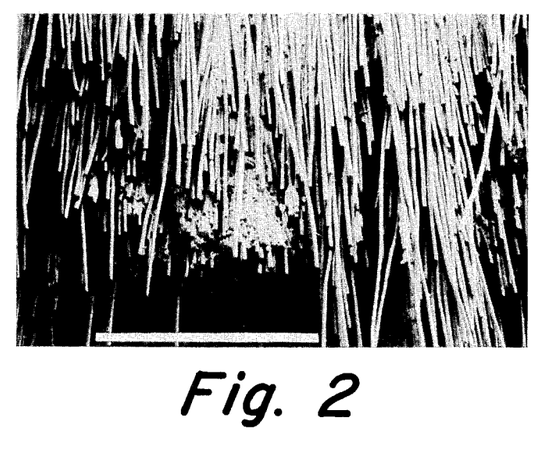
FIG. 2 is an electron photomicrograph of the fracture surface of a composite provided in accordance with the invention after failure under oxidizing conditions at 1000° C.

FIG. 2 shows a fracture surface of a composite having the matrix composition of Example 7 in Table II, the white bar in the micrograph representing a dimension of 1 mm. The fracture surface shown is generated in the course of flexural failure of the composite under stress applied at 1000° C. in an oxidizing atmosphere. As is evident from a study of this micrograph, a highly fibrous fracture mode characterized by extensive fiber pullout is retained notwithstanding the oxidizing conditions and very high temperature employed for stress testing. This failure mode also promises good fracture toughness at this temperature.

The extended nature of the fiber pullout observed in some of the composites of the invention has not previously been observed at temperatures as high as 1000° C. This is presently attributed to the presence of a weak oxide interface at or near the fiber/matrix boundary region in these composites, which interface is apparently capable of controlling the fracture failure of the material at high temperatures. In fact, fiber separation at the oxide interface appears to occur in preference to separation at a carbon or graphitic interface which may be present in fiber composites such as shown in the Examples and comprising silicon carbide fibers.

While the ultimate flexural strengths of these composite materials are not particularly high in comparison with composites comprising some of the newer high strength matrix materials, the desirable fiber pullout failure mode of these composites is nevertheless thought to favor their use in applications requiring gradual composite failure, particularly where operation at very high temperatures is not required.

As previously described, the achievement of advantageous fracture behavior in ceramic matrix composites comprising more conventional matrix materials is also possible in accordance with the invention. This result is achieved by applying a mica coating to the fiber reinforcement material to impart the desirable behavior of the mica oxide interface to the fibers, as detailed in the following illustrative examples.

EXAMPLE 10—COATED FIBERS

A sol for a gel precursor of potassium phlogopite mica $[KMg_3(AlSi_3O_{10})F_2]$ is prepared by dissolving the required metallic and fluorine components of the fluormica in an organic solvent. The metallic constituents are provided in the form of organometallic source compounds therefor.

For each gram equivalent of mica to be provided in the sol, 1.481 grams of silicon tetraethoxide [Si- $(OC_2H_5)_4$], 0.166 grams of potassium methoxide [$K(OCH_3)$], and 0.814 grams of magnesium diethoxide [$Mg(OC_2H_5)_2$] are sequentially added, under nitrogen, to 75 ml of ethylene glycol monomethyl ether solvent. Approximately 5% by weight of nitric acid is added to the solvent prior to the dissolution of the organometallic compounds therein, both to facilitate solution of the organometallics and to control the rates of hydrolysis thereof in the course of later mica crystal development.

The mixture thus provided is refluxed under flowing nitrogen gas to complete the dissolution of the solutes, and then 0.584 grams of aluminum tributoxide [$Al(OC_4H_9)_3$] are added to the solution, with continued refluxing, to obtain a clear homogeneous solution of all organometallic components.

Ammonium hydrogen fluoride ($NH_4F \cdot HF$) is next added to the organometallic solution to provide the fluorine component of the desired synthetic mica crystals. For each gram equivalent of mica required, approximately 0.133 grams of ammonium hydrogen fluoride are dissolved in 25 ml of a solvent consisting of methanol containing 10% (wt) of $HNO_3$. This solution is then added dropwise to the refluxing organometallic solution, the latter solution remaining clear and non-viscous in the course of this addition.

Conversion of the clear sol prepared as described to a mica gel precursor is most conveniently carried out in situ on the fibers to be coated. This is done by first coating the selected fibers with the sol, and then hydrolyzing the resulting coating. Hydrolysis is conveniently achieved by exposing the coated fibers to the ambient atmosphere at moderately elevated temperatures, e.g., in the range of 100°–400° C.

Following this procedure, Nicalon® fiber tows as described in Examples 1–9 are immersed in the organometallic sol produced as above described, and then the sol coating on the fibers is hydrolyzed to a gel coating and dried. Hydrolysis and drying are achieved by heating the fibers in the ambient atmosphere to 180° C. for 3 minutes, followed by further ambient heating to 250° C. for 3 minutes. The product is a fiber tow wherein the individual fibers are coated with the desired alkoxide/hydroxide gel.

Conversion of these gel-coated fibers to mica-coated fibers is achieved by heating the fibers in air to a peak temperature of approximately 1000° C. On initial heating, excess solvent, alcohol, and water are evolved from the gel. Further heating then causes condensation of the hydroxyl groups and alkoxy ligands present in the gel, resulting in the conversion thereof into an amorphous oxidic mixture. Finally, further heating of the coated fibers, to a temperature in excess of 800° C. and optimally to about 1000° C., crystallizes the glassy gel coating to a crystalline mica coating.

The predominance of crystalline mica in fiber coatings produced as described is confirmed by X-ray diffraction analysis of powders taken from the mica coatings, with the presence of fluorine being separately determined by chemical analysis. Patterns exhibiting the D-spacing characteristic of potassium phlogopite mica are observed, although impurities such as forsterite ($Mg_2Si_4$), enstatite, and cristobalite may also be detected if the fluoride content of the coating is too low. In most cases, insufficient fluorine content can be traced to excessively long exposure of the coated fibers to air at temperatures above 1000° C. The preferred use of excess $NH_4F \cdot HF$ (approximately 20–30% over stoichiometric proportions) in the mica sol can further reduce any fluorine deficiencies which might otherwise arise.

EXAMPLES 11–14—COMPOSITE PRODUCTS

Following the procedure of Example 10, an organometallic sol containing source compounds for the development of potassium phlogopite mica [$KMg_3(AlSi_3O_{10})F_2$] is prepared for application to a Nicalon® silicon carbide fiber tow. For these examples, however, a polyvinyl acetate binder is added to the organometallic sol prior to the application of the sol to the fibers in order to improve the integrity of the gel coating during subsequent processing of the coated tows. The binder is added in a proportion equivalent to about 0.1 gram of binder per gram of equivalent oxide constituents present in the sol.

The resulting sol is applied to the fiber tow as described in Example 10, and then gelation of the sol coating and "curing" of the resulting gel coating is achieved by heating the coated fibers to a temperature of approximately 300° C. in air. This heating results in a tough coating wherein the polyvinyl acetate retains its character as an effective binder to protect the coating from damage and/or separation from the fibers.

To provide a ceramic matrix composite product incorporating the coated fibers, the coated fiber tow is impregnated with a selected powdered glass matrix material. The glass powder selected is of alkaline earth aluminosilicate composition, having an average particle size of approximately 10 microns. The glass has the composition of Glass H from Table I, and is convertible to a glass-ceramic comprising a principal crystal phase of anorthite upon appropriate heat treatment.

The glass matrix material is incorporated into the coated fiber tow by passing the tow through a suspension of the glass powder in an aqueous vehicle, following the slurry coating procedure described in Example I above. The suspension is made by mixing approximately 25 parts by weight of the powdered glass in a vehicle consisting of 46 parts by weight of water, 15 parts by weight of isopropanol, and 12 parts by weight of a polyvinyl acetate binder. The fiber tow is impregnated by passing it through this suspension, and then the impregnated tow is wound on a drum, dried, and cut from the drum to provide prepreg sheets comprising the gel-coated fibers in the particulate glass matrix material.

Several fiber-reinforced composite products comprising an anorthite matrix reinforced with mica-coated silicon carbide fibers are made from the prepreg sheets by stacking in groups of eight sheets to form fiber-aligned prepreg stacks. The stacks are then consolidated by hot pressing, the hot pressing being carried out by heating to a peak temperature in the range of about 1250°–1320° C. under a pressure of approximately 1500 psi. The resulting products are dense, substantially void-free composites wherein the glass matrix precursor has been converted to a highly crystalline anorthite glass ceramic matrix.

Analysis of the composite products thus provided indicates that a mica coating on the fibers has been developed from the gel coating in the course consolidation of the composite product. The gel does not appear to interact extensively with either the fibers or the matrix in the course of the consolidation, but rather is retained as a discrete coating. Hence preliminary analysis of the fracture surfaces of these products indicates the presence of coating residue on both the surfaces of fibers pulled from the matrix and on fiber troughs left in the matrix after separation of the matrix from the embedded fibers.

Some results of the flexural testing of composites produced as above described are reported in Table V below. Reported in Table V for each of these products are data concerning the consolidation process used to convert the coated fiber prepregs to dense composites, including the peak consolidation temperatures and pressures. Also reported are the elastic and ultimate stress and strain data recorded for each of the samples as determined in 4-point flexure utilizing a 20 mm load span and a 60 mm support span, following the testing procedure and data reporting format of Examples 1–9 above. Again, all strains (Stn.) are reported as sample elongations in %, while stresses (Str.) are reported in ksi.

Finally, Table V reports information as to the fracture behavior observed for the products being tested. This data includes an indication of the sample failure mode, whether in shear (S), or under tension (T), and an indication of the fracture habit observed, whether involving fiber pullout (F) or a combination of fiber pullout and brittle (B) or woody (W) fracture.

TABLE V

| Ex. | Consol. Temp. (°C.) | Consol. Press. (ksi) | Test Temp. (°C.) | Elastic Str. (ksi) | Elastic Stn. (%) | Ultimate Str. (ksi) | Ultimate Stn. (%) | Flexural Fracture Data |
|---|---|---|---|---|---|---|---|---|
| 11 | 1308° | 1.5 | 25° | 29.2 | 0.16 | 79.6 | 0.54 | S,F |
|  |  |  | 1000° | 40.7 | 0.28 | 61.9 | 0.45 | T,S;B-W |
| 12 | 1260° | 1.5 | 25° | 24.6 | 0.14 | 85.6 | 0.62 | S,F |
|  |  |  | 1000° | 39.9 | 0.28 | 64.7 | 0.48 | T,S;B-W |
| 13 | 1308° | 1.5 | 25° | 22.1 | 0.13 | 111.4 | 0.82 | S,F |
|  |  |  | 1000° | 41.7 | 0.27 | 53.4 | 0.35 | T,S;B-W |
| 14 | 1260° | 1.5 | 25° | 19.0 | 0.11 | 90.7 | 0.63 | S,F |
|  |  |  | 1000° | 38.5 | 0.25 | 56.2 | 0.38 | T,S;B-W |

An examination of the flexural strength test data reported in Table V indicates not only good fiber pullout behavior at ambient test temperatures, but also the retention of non-brittle fracture at elevated temperatures. While not demonstrating the extensive fiber pullout at 1000° C. shown by the mica matrix composites of Examples 1–9, these products nevertheless show fracture behavior at 1000° C. indicating the retention of the protective and fiber release characteristics imparted by the mica interface layer. Thus, in addition to partially woody fracture, these materials show significant sample elongation (greater than 0.10%) between the elastic elongation limit and the point of flexural failure. This is again indicative of non-brittle fracture, and is in clear contrast to the behavior observed when Nicalon ® fibers not provided with mica coatings are employed in this matrix material.

While only short fiber pullout lengths are observed at high temperatures in the course of testing these composites, it is anticipated that the use of thicker mica coatings would improve this aspect of fracture behavior. Thus fibers comprising mica coatings of approximately 0.2–0.5 microns thickness, rather than 0.1 microns as for Examples 11–14, would be expected to exhibit further improvements in high temperature fiber pullout performance.

As indicated above, the advantages of the mica coating procedure of the invention are not limited to potassium phlogopite mica interface layers alone. The following Example illustrates the application and use of an alternative mica coating material.

EXAMPLE 15

Following the general procedures of Example 10, a sol suitable for the development of gel precursor for a potassium tetrasilicic mica [KMg$_{2.5}$(Si$_4$O$_{10}$)F$_2$] *instead of a potassium phlogopite mica is prepared. This sol is made by combining, for each gram equivalent of mica required, about* 0.171 grams of potassium methoxide, 0.697 grams of magnesium diethoxide, and 2.028 grams of silicon tetraethoxide in 75 ml of acidified ethylene glycol monomethyl ether solvent. To this mixture is added 0.139 grams of ammonium hydrogen fluoride dissolved in 25 ml of acidified methanol. After refluxing, the resulting sol is clear and fluid.

The sol produced as described is next applied to the surfaces of silicon oxycarbide fibers contained in the commercially available Nicalon ® fiber tow described in the previous examples, by passing the fiber tow through the sol. Thereafter, the sol-coated fiber tow is air-dried to convert the sol coating to a clear gel coating on the fibers.

Fibers provided with the mica precursor gel coating are heated to 300° C. to drive off residual solvents and water while retaining the organic binder in the coating.

The fibers are then provided with a gel overcoating having a composition corresponding to that of anorthite by repeating the above coating procedure with an organometallic anorthite sol.

The anorthite sol to be used for overcoating is prepared by reacting 15.8 grams of calcium metal with 90 ml of methanol to form calcium methoxide. The methoxide is then dissolved in a solvent consisting of 1000 ml of ethylene glycol monomethyl ether containing 10 ml HNO$_3$, in which are also dissolved 228 grams of aluminum tributoxide and 165 grams of silicon tetraethoxide. Each of the foregoing operations is carried out under flowing nitrogen gas.

To the solution thus provided are added 13 grams of Zr(OC$_4$H$_9$)$_4$·C$_4$H$_9$OH and 1.3 grams arsenic triethoxide, yielding approximately 1400 ml of a concentrated anorthite sol. The sol is then homogenized by stirring and refluxing for two hours under nitrogen to provide a clear colorless fluid.

A fiber coating sol is next prepared by diluting 22 ml of the anorthite sol to 200 ml with ethylene glycol monomethyl ether, and then adding 0.2 grams polyvinyl acetate as a coating binder. This coating sol is then applied to the mica-coated fibers, dried, hydrolyzed, and heated to 300° C. to set the coating utilizing the same procedures as used for the application of the mica gel coating.

The coated fiber tow thus provided is then incorporated into an alkaline earth aluminosilicate glass ceramic matrix material following the procedure described in Examples 11–14 above, and is consolidated as therein described to yield a dense ceramic matrix composite product.

The composite product provided as described is a substantially void-free ceramic matrix composite comprising a highly crystalline anorthite glass-ceramic matrix. Disposed within the anorthite matrix is a silicon carbide fiber reinforcement phase wherein the silicon carbide fibers are provided with an integral protective coating consisting essentially of the potassium tetrasilicic mica described.

Composites produced as described are subjected to evaluation tests as described in Examples 11-14 above. Results for such tests are reported in Table VI below, including consolidation process data, an indication of the flexure testing temperature, and elastic and ultimate stress and strain data recorded in the 4-point flexure tests. Again, all strains (Stn.) are reported as sample elongations in %, while stresses (Str.) are reported in ksi.

The Table also includes information as to the fracture behavior observed for the products being tested, including information as to the failure mode (S or T) and as to the fracture habit observed (F, W and/or B). The fracture behavior notation follows that used in Table V above.

TABLE VI

| | | | | Product Analysis | | | | |
|---|---|---|---|---|---|---|---|---|
| | Consol. Temp. | Consol. Press. | Test Temp. | Elastic Str. - Stn. | | Ultimate Str. - Stn. | | Flexural Fracture |
| Ex. | (°C.) | (ksi) | (°C.) | (ksi) | (%) | (ksi) | (%) | Data |
| 15 | 1203° | 1.5 | 25° | 36.4 | 0.21 | 74.8 | 0.49 | S,T;F |
| | | | 1000° | 53.7 | 0.37 | 72.1 | 0.50 | T,S;W |
| 15 | 1252° | 1.5 | 25° | 45.6 | 0.26 | 89.8 | 0.67 | S,T;F |
| | | | 1000° | 46.3 | 0.30 | 67.4 | 0.45 | T,S;B |

An examination the flexural strength test data reported in Table VI indicates that, particularly at the 1203° C. consolidation temperature, very little degradation in the ultimate stress and strain is seen at test temperatures of 1000° C. relative to the results observed at 25° C. This demonstrates the excellent protective and fiber release characteristics imparted by the mica interface layer.

The somewhat lower 1000° C. test results observed for the composite consolidated at 1252° C. are presently attributed to possible degradation of the mica interface, presumably caused by the higher consolidation temperature employed. This effect becomes even larger as still higher consolidation temperatures (e.g., in the range of 1300°-1340° C.) are used. Thus the composite processing temperature should not exceed that at which the desirable protective and fiber release characteristics of the mica interface layer may be maintained.

Of course the foregoing examples are merely representative, and it will be recognized that, while the invention has been particularly described with respect to specific materials and specific procedures, those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A ceramic matrix composite article comprising (i) a matrix phase consisting essentially of a ceramic material selected from the group consisting of crystalline ceramics, glass-ceramics and glasses, and (ii) a fiber reinforcement phase consisting essentially of a multiplicity of amorphous or crystalline inorganic fibers disposed within the matrix phase, characterized in that a layer of sheet silicate crystals is provided on or in close proximity to the surfaces of the inorganic fibers, said layer constituting a sheet silicate interface between the inorganic fibers and the matrix phase.

2. A ceramic matrix composite article in accordance with claim 1 wherein the inorganic fibers are fibers having a composition selected from the group consisting of silicon carbide, silicon oxycarbide, carbon, alumina, $B_4C$, BN, zircon, mullite, spinel and silicon nitride.

3. A ceramic matrix composite article in accordance with claim 2 wherein the sheet silicate crystals consist essentially of synthetic fluormica crystals.

4. A ceramic matrix composite article in accordance with claim 3 wherein the ceramic matrix material is a synthetic fluormica glass-ceramic.

5. A ceramic matrix composite article in accordance with claim 4 wherein the matrix phase consists essentially of a glass-ceramic material selected from the group consisting of:

I. glass-ceramics comprising crystals of fluorophlogopite solid solution, said crystals having a form selected from the group consisting of normal fluorophlogopite ($KMg_3AlSi_3O_{10}F_2$), boron fluorophlogopite ($KMg_3BSi_3O_{10}F_2$) and subpotassic phlogopite ($K_{0.5}Mg_2Al_{.83}BSi_3O_{10}F_2$), and said glass-ceramics having a composition consisting essentially, in weight percent, of about 25-60% $SiO_2$, 15-35% $R_2O_3$, wherein $R_2O_3$ consists of 3-15% $B_2O_3$ and 5-25% $Al_2O_3$, 2-20% $R_2O$, wherein $R_2O$ consists of 0-15% $Na_2O$, 0-15% $K_2O$, 0-15% $Rb_2O$, and 0-20% $Cs_2O$, 4-25% MgO, 0-7% $Li_2O$, 6-25% total of MgO+$Li_2O$, and 4-20% F;

II. glass-ceramics comprising tetrasilicic fluormica crystals, said crystals having the form $XMg_{2.5}Si_4O_{10}F_2$ wherein X is an element selected from the group of K, Rb, Cs, Sr, Ba, and Cd, and said glass-ceramics having a composition consisting essentially, in weight percent, of about 45-70% $SiO_2$, 8-20% MgO, 8-15% $MgF_2$, 5-25% $R_2O$, wherein $R_2O$ consists of one or more oxides selected in the indicated proportions from the group consisting of 0-20% $K_2O$, 0-23% $Rb_2O$, and 0-25% $Cs_2O$, 0-20% RO, wherein RO consists of one or more oxides selected from the group consisting of SrO, BaO and CdO, 5-35% total of $R_2O$+RO, and 0-10% of oxides selected from the group consisting of $As_2O_5$ and $Sb_2O_5$; and III. glass-ceramics comprising trisilicic fluormica crystals, said crystals having the form $R_{0.5-1}Mg_{1.0-2.5}(AlSi_3)F_2$ wherein R is an element selected from the group consisting of Sr and Ba, and said glass-ceramics having a composition substantially free of alkali metals and $B_2O_3$ and consisting essentially, in weight percent, of about 30–65% $SiO_2$, 5–26% $Al_2O_3$, 10–35% MgO, 3–30% RO, wherein RO consists of 3–30% SrO and 0–25% BaO, and 3–15% F.

6. A ceramic matrix composite article comprising (i) a matrix phase consisting essentially of a ceramic material selected from the group consisting of aluminosilicate glasses, lithium aluminosilicate glass-ceramics, and alkaline earth aluminosilicate glass-ceramics, and (ii) a fiber reinforcement phase consisting essentially of a multiplicity of amorphous or crystalline inorganic fibers disposed within the matrix phase, characterized in that
    a layer of sheet silicate crystals is provided on or in close proximity to the surfaces of the inorganic fibers, said layer constituting a sheet silicate interface between the inorganic fibers and the matrix phase.

7. A ceramic matrix composite article in accordance with claim 6 wherein the inorganic fibers are fibers having a composition selected from the group consisting of silicon carbide, silicon oxycarbide, carbon, alumina, $B_4C$, BN, zircon, mullite, spinel and silicon nitride.

8. A ceramic matrix composite article in accordance with claim 7 wherein the inorganic fibers are selected from the group consisting of silicon carbide fibers and silicon oxycarbide fibers, and wherein the layer of sheet silicate crystals comprises a coating of synthetic fluormica crystals disposed on the surfaces of the inorganic fibers or on an undercoating disposed on said surfaces.

9. A ceramic matrix composite article in accordance with claim 8 wherein the coating of synthetic fluormica crystals is selected from the group consisting of:
  I. coatings comprising crystals of fluorophlogopite solid solution, said crystals having a crystal form selected from the group consisting of normal fluorophlogopite ($KMg_3AlSi_3O_{10}F_2$), boron fluorophlogopite ($KMg_3BSi_3O_{10}F_2$) and subpotassic phlogopite ($K_{0.5}Mg_2Al_{1.83}BSi_3O_{10}F_2$), and said coating having a composition consisting essentially, in weight percent, of about 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O$, and 0–20% $Cs_2O$, 4–25% MgO, 0–7% $Li_2O$, 6–25% total of MgO+$Li_2O$, and 4–20% F;
  II. coatings comprising tetrasilicic fluormica crystals, said crystals having the form $XMg_{2.5}Si_4O_{10}F_2$ wherein X is an element selected from the group of K, Rb, Cs, Sr, Ba, and Cd, and said coating having a composition consisting essentially, in weight percent, of about 45–70% $SiO_2$, 8–20% MgO, 8–15% $MgF_2$, 5–25% $R_2O$, wherein $R_2O$ consists of one or more oxides selected in the indicated proportions from the group consisting of 0–20% $K_2O$, 0–23% $Rb_2O$, and 0–25% $Cs_2O$, 0–20% RO, wherein RO consists of one or more oxides selected from the group consisting of SrO, BaO and CdO, 5–35% total of $R_2O$+RO, and 0–10% of oxides selected from the group consisting of $As_2O_5$ and $Sb_2O_5$; and
  III. coatings comprising trisilicic fluormica crystals, said crystals having the form $R_{0.5-1}Mg_{1.0-2.5}(AlSi_3O_{10})F_2$ wherein R is an element selected from the group consisting of Sr and Ba, and said coating having a composition substantially free of alkali metals and $B_2O_3$ and consisting essentially, in weight percent, of about 30–65% $SiO_2$, 5–26% $Al_2O_3$, 10–35% MgO, 3–30% RO, wherein RO consists of 3–30% SrO and 0–25% BaO, and 3–15% F.

10. A ceramic matrix composite article in accordance with claim 8 wherein the ceramic matrix material is an alkaline earth aluminosilicate glass having a composition substantially free of $Na_2O$, $Li_2O$, and $K_2O$ and consisting essentially, in weight percent, of about 50–66% $SiO_2$, 11–19% $Al_2O_3$, 20–30% total of RO, wherein RO consists of one or more oxides selected from the group consisting of CaO, MgO, SrO and BaO, 0–8% $B_2O3$, and 0–2% of $As_2O3$.

11. A ceramic matrix composite in accordance with claim 8 wherein the ceramic matrix material is a glass-ceramic material selected from the group consisting of:
  I. glass-ceramics comprising a predominant crystal phase selected from the group of anorthite and pseudobinaries of anorthite with mullite ($3Al2O3 \cdot SiO2$), cordierite ($2MgO \cdot 2Al2O3 \cdot 5SiO2$), barium osumilite ($BaO \cdot 2MgO \cdot 3Al2O3 \cdot 9SiO2$) albite solid solution ($Na2O \cdot Al2O3 \cdot 6SiO2$), $Al2O3$, $SiO2$, $CaO \cdot SiO2$, and gehlenite ($2CaO \cdot Al2O3 \cdot SiO2$), said glass-ceramic having a composition consisting essentially, in weight percent, of about 0–25% CaO, 0–30% SrO, 10–30% CaO+SrO, 0–15% MgO, 0–25% BaO, 0–4% $Na2O$, 0–6% $K2O$, 25–38% $Al2O3$, 0–12% $TiO2$, 35–60% $SiO2$, 0–15% $ZrO2$, 0–3% $As2O3$, and 0–30% total of BaO+MgO+$Na2O$+$K2O$+$TiO2$+$ZrO2$+$As2O3$.
  II. glass-ceramics comprising a predominant crystal phase consisting essentially of triclinic anorthite in solid solution with at least one of mullite and alpha alumina, said glass-ceramic having a composition consisting essentially, in weight percent, of about 16–20% CaO, 38.5–46% $Al2O3$, 35–42% $SiO2$, 0.25–3% $As2O3$, and up to 10% total of at least one nucleating agent selected in the indicated proportion from the group consisting of 0.1–3% $Cr2O3$, 0.25–3% $HfO2$, 2–5% $MoO3$, 0.25–3% $Nb2O5$, 0.25–3% $Ta2O5$, 0.25–3% $WO3$, and 1–10% $ZrO2$, and said composition being substantially free of $TiO2$ and comprising $Al2O3$ in a proportion ranging about 10–50 mole percent in excess of said $Al2O3$ in stoichiometric triclinic anorthite.

* * * * *